US011208793B2

(12) United States Patent
Liu et al.

(10) Patent No.: US 11,208,793 B2
(45) Date of Patent: Dec. 28, 2021

(54) SANITARY EQUIPMENT WITH WATER SUPPLY SYSTEM, WATER ROUTE SYSTEM AND SINK

(71) Applicants: Po-Chun Liu, Taipei (TW); Wen-Yi Chiu, Taipei (TW); Pin-Hsing Lee, Taipei (TW)

(72) Inventors: Po-Chun Liu, Taipei (TW); Wen-Yi Chiu, Taipei (TW); Pin-Hsing Lee, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 110 days.

(21) Appl. No.: 16/658,183

(22) Filed: Oct. 21, 2019

(65) Prior Publication Data

US 2020/0141098 A1 May 7, 2020

Related U.S. Application Data

(60) Provisional application No. 62/748,526, filed on Oct. 22, 2018.

(51) Int. Cl.
| | | |
|---|---|---|
| *E03C 1/048* | (2006.01) | |
| *E03C 1/05* | (2006.01) | |
| *E03C 1/046* | (2006.01) | |
| *E03C 1/044* | (2006.01) | |
| *E03C 1/10* | (2006.01) | |
| *E03C 1/04* | (2006.01) | |
| *C02F 1/32* | (2006.01) | |

(52) U.S. Cl.
CPC .............. *E03C 1/048* (2013.01); *E03C 1/044* (2013.01); *E03C 1/0465* (2013.01); *E03C 1/057* (2013.01); *E03C 1/106* (2013.01); *C02F 1/32* (2013.01); *E03C 2001/0417* (2013.01); *E03C 2201/40* (2013.01)

(58) Field of Classification Search
CPC ...................................... E03C 1/048
USPC ... 4/678, 567, 584, 596, 615, 624, 653, 668, 4/671, 675; 137/615, 800, 801, 861
See application file for complete search history.

(56) References Cited

FOREIGN PATENT DOCUMENTS

| | | |
|---|---|---|
| CN | 2097597 | 3/1992 |
| CN | 2898122 | 5/2007 |
| CN | 201219852 | 4/2009 |
| CN | 203563995 | 4/2014 |
| CN | 105858826 | 8/2016 |
| CN | 206799326 | 12/2017 |
| JP | 2016041874 | 3/2016 |
| TW | 201602013 | 1/2016 |

OTHER PUBLICATIONS

"Office Action of Taiwan Counterpart Application", dated Sep. 10, 2020, pp. 1-5.
"Office Action of China Counterpart Application", dated Sep. 2, 2020, pp. 1-11.

*Primary Examiner* — Lori L Baker
(74) *Attorney, Agent, or Firm* — JCIPRNET

(57) ABSTRACT

A sanitary equipment with a water supply system, a water route system, and a hand washing table are provided. The sanitary equipment includes a machine having a machine water outlet; a movable hand washing table pivoted on the machine and located below the machine water outlet, the movable hand washing table being capable of opening or retracting with respect to the machine; and a water route system disposed in the machine and connected to the machine water outlet to discharge potable water and non-potable water from the machine water outlet.

15 Claims, 15 Drawing Sheets

SANITARY EQUIPMENT WITH WATER SUPPLY SYSTEM, WATER ROUTE SYSTEM AND SINK

CROSS REFERENCE TO RELATED APPLICATION

This application claims the priority benefit of U.S. provisional application Ser. No. 62/748,526, filed on Oct. 22, 2018. The entirety of the above-mentioned patent application is hereby incorporated by reference herein and made a part of specification.

BACKGROUND

Technical Field

The invention relates to an equipment, a system, and a hand washing table, and more particularly, to a sanitary equipment with a water supply system, a water route system, and a hand washing table.

Description of Related Art

Washing hands frequently is a preventive method for modern people to preliminarily prevent diseases caused by germs.

Most of the sanitary equipment currently seen in the public environment is composed of faucets, a hand washing table, and a water route system configured to supply water to the faucets. If the space permits, equipment for providing paper towels or a drying machine may be further placed. Such a configuration architecture generally requires a larger configuration space.

SUMMARY

The invention provides a multifunctional sanitary equipment with a water supply system.

The invention provides a water route system having an architecture different from the related art.

The invention provides a hand washing table capable of preventing water splash.

A sanitary equipment with a water supply system of the invention includes: a machine having a machine water outlet; a movable hand washing table pivoted on the machine and located below the machine water outlet, wherein the movable hand washing table is capable of opening or retracting with respect to the machine; and a water route system disposed in the machine and connected to the machine water outlet to discharge potable water and non-potable water from the machine water outlet.

In an embodiment of the invention, the movable hand washing table includes: a water sink pivoted on the machine and being capable of opening or retracting with respect to the machine, wherein the water sink has a water collection opening and a sink water outlet; a water collection tank disposed in the machine and being in communication with the water sink via the sink water outlet to receive a liquid discharged from the water sink; and a water collection plate disposed in the water collection opening, wherein the water collection plate is capable of collecting and guiding a liquid located thereon to flow into the water sink.

In an embodiment of the invention, the water sink has an overflow prevention plate, the overflow prevention plate is located on one side of the water sink adjacent to the water collection tank, and the water collection plate is connected to the overflow prevention plate.

In an embodiment of the invention, the water collection plate is in a honeycomb shape.

In an embodiment of the invention, the sink water outlet has a plurality of water guide grooves.

In an embodiment of the invention, the water route system includes: a water inlet pipe; a filter unit connected to the water inlet pipe and configured to filter non-potable water entering via the water inlet pipe; an electronic water valve unit being in communication with the filter unit to receive the non-potable water filtered by the filter unit; a plurality of check valves disposed between the filter unit and the electronic water valve unit to prevent the non-potable water from flowing back to the filter unit; at least one non-potable water outlet in communication with the electronic water valve unit; a potable water outlet being in communication with the electronic water valve unit and arranged in line with the non-potable water outlet on the machine to form the machine water outlet; and a UV sterilization device disposed between the electronic water valve unit and the potable water outlet and configured to sterilize the non-potable water, which is to flow into the potable water outlet, to form the potable water.

In an embodiment of the invention, the water route system further includes an electrolysis device disposed between the filter unit and one of the check valves.

In an embodiment of the invention, the water route system further includes a heating unit disposed between another of the check valves and the electronic water valve unit.

In an embodiment of the invention, the water route system further includes a power supply unit electrically connected to the electronic water valve unit.

In an embodiment of the invention, the water route system further includes a water outlet pipe configured to discharge water filtered out by the filter unit.

In an embodiment of the invention, the machine further includes a UV sterilization lamp disposed adjacent to the machine water outlet.

In an embodiment of the invention, the machine further includes an air outlet located on one side of the machine water outlet.

In an embodiment of the invention, the machine water outlet has a plurality of water sub-outlets, and the machine further includes a plurality of water discharge sensing units, wherein the water discharge sensing units are disposed corresponding to the water sub-outlets in a one-to-one manner, and when at least one of the water discharge sensing units detects an object, the water sub-outlet corresponding to the water discharge sensing unit which detects the object discharges water.

In an embodiment of the invention, the machine further includes a hand soap supply unit disposed on the machine and located on one side of the machine water outlet.

In an embodiment of the invention, the hand soap supply unit includes: a hand soap tank movably assembled to the machine, located on one side of the machine water outlet, and being capable of being relatively received in the machine or withdrawn out of the machine, wherein the hand soap tank has a hand soap flow path and a hand soap outlet in communication with the hand soap flow path; and an infrared sensor disposed on an outer side of the hand soap tank toward the movable hand washing table.

In an embodiment of the invention, the hand soap supply unit further includes a power device configured to squeeze a hand soap contained in the hand soap tank, the power device including: a rotating disc disposed on one side of the hand soap tank; a transmission rod linked with the rotating disc; a piston disposed at a front end of the transmission rod; and a hand soap check valve disposed at a bottom side of the hand soap tank, wherein the hand soap contained in the hand soap tank enters the hand soap flow path through the hand soap check valve.

A water route system includes: a water inlet pipe; a filter unit connected to the water inlet pipe and configured to filter non-potable water entering via the water inlet pipe; an electronic water valve unit being in communication with the filter unit to receive the non-potable water filtered by the filter unit; a check valve disposed between the filter unit and the electronic water valve unit to prevent the non-potable water from flowing back to the filter unit; at least one non-potable water outlet in communication with the electronic water valve unit; a potable water outlet being in communication with the electronic water valve unit and arranged in line with the non-potable water outlet on the machine to form the machine water outlet; and a UV sterilization device disposed between the electronic water valve unit and the potable water outlet and configured to sterilize the non-potable water, which is to flow into the potable water outlet, to form potable water.

In an embodiment of the invention, the water route system further includes an electrolysis device disposed between the filter unit and the check valve.

In an embodiment of the invention, the water route system further includes a heating unit disposed between the check valve and the electronic water valve unit.

In an embodiment of the invention, the water route system further includes a power supply unit electrically connected to the electronic water valve unit.

In an embodiment of the invention, the water route system further includes a water outlet pipe configured to discharge water filtered out by the filter unit.

A hand washing table, which is adapted to be mounted on a machine and capable of opening and closing with respect to the machine, includes: a water sink pivoted on the machine and being capable of opening or retracting with respect to the machine, wherein the water sink has a water collection opening and a sink water outlet; a water collection tank disposed in the machine and being in communication with the water sink via the sink water outlet to receive a liquid discharged from the water sink; and a water collection plate disposed in the water collection opening, wherein the water collection plate is capable of collecting and guiding a liquid located thereon to flow into the water sink.

In an embodiment of the invention, the water sink has an overflow prevention plate, the overflow prevention plate is located on one side of the water sink adjacent to the water collection tank, and the water collection plate is connected to the overflow prevention plate.

In an embodiment of the invention, the water collection plate is in a honeycomb shape.

In an embodiment of the invention, the sink water outlet has a plurality of water guide grooves.

Based on the above, the invention provides the sanitary equipment with a water supply system, the water route system, and the hand washing table. The sanitary equipment has multiple functions and can supply potable water and non-potable water as needed. Since its movable hand washing table can be opened or retracted with respect to the machine, it saves space when the movable hand washing table is retracted with respect to the machine. Furthermore, the water route system disposed in the machine is provided with a novel architecture and thus can ensure proper water supply.

DESCRIPTION OF THE EMBODIMENTS

Figure 1:
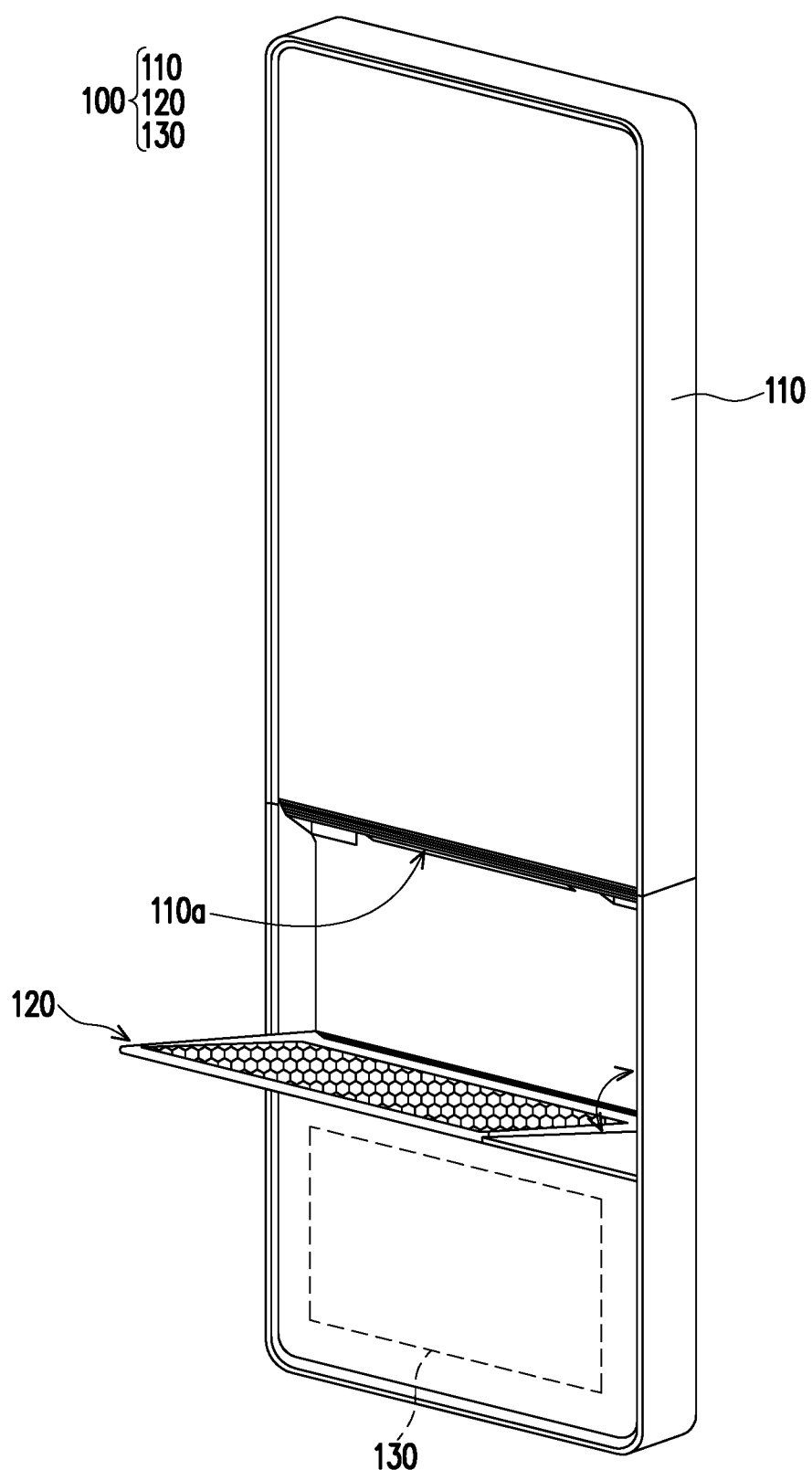
FIG. 1 is a schematic view of a sanitary equipment with a water supply system of the invention.

FIG. 1 is a schematic view of a sanitary equipment with a water supply system of the invention. Referring to FIG. 1, a sanitary equipment 100 with a water supply system of the present embodiment is capable of providing potable water, non-potable water, and functions such as cleaning, and meanwhile has a movable hand washing table 120 and a water route system 130 of a novel architecture, so it is suitable to be installed in a space-saving manner for use in a private place such as a bathroom, a living room, a kitchen, etc. at home, or a public place such as a cosmetics counter, a restaurant, a food street, etc.

The sanitary equipment 100 with a water supply system includes a machine 110, a movable hand washing table 120, and a water route system 130. The machine 110 has a machine water outlet 110a, and the movable hand washing table 120 is pivoted on the machine 110. Therefore, the movable hand washing table 120 may be opened with respect to the machine 110 to be used when needed, or retracted with respect to the machine 110 to be stored when it is not in use. When the movable hand washing table 120 is opened with respect to the machine 110, the movable hand washing table 120 is located below the machine water outlet 110a. The water route system 130 is disposed in the machine 110 and is connected to the machine water outlet 110a so that potable water and non-potable water can flow from the machine water outlet 110a.

Figure 2:
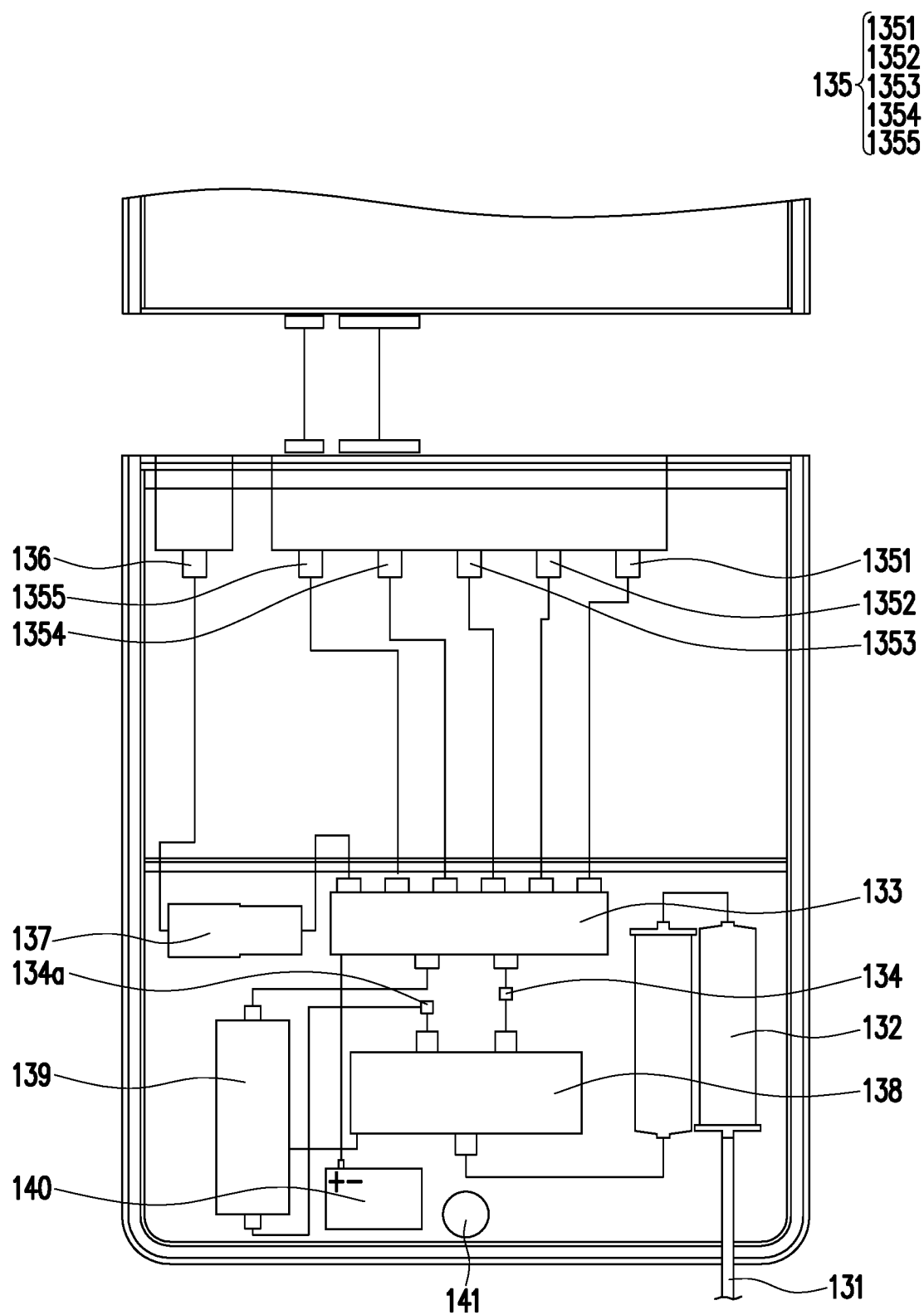
FIG. 2 is a schematic view of a water route system.
Figure 3:
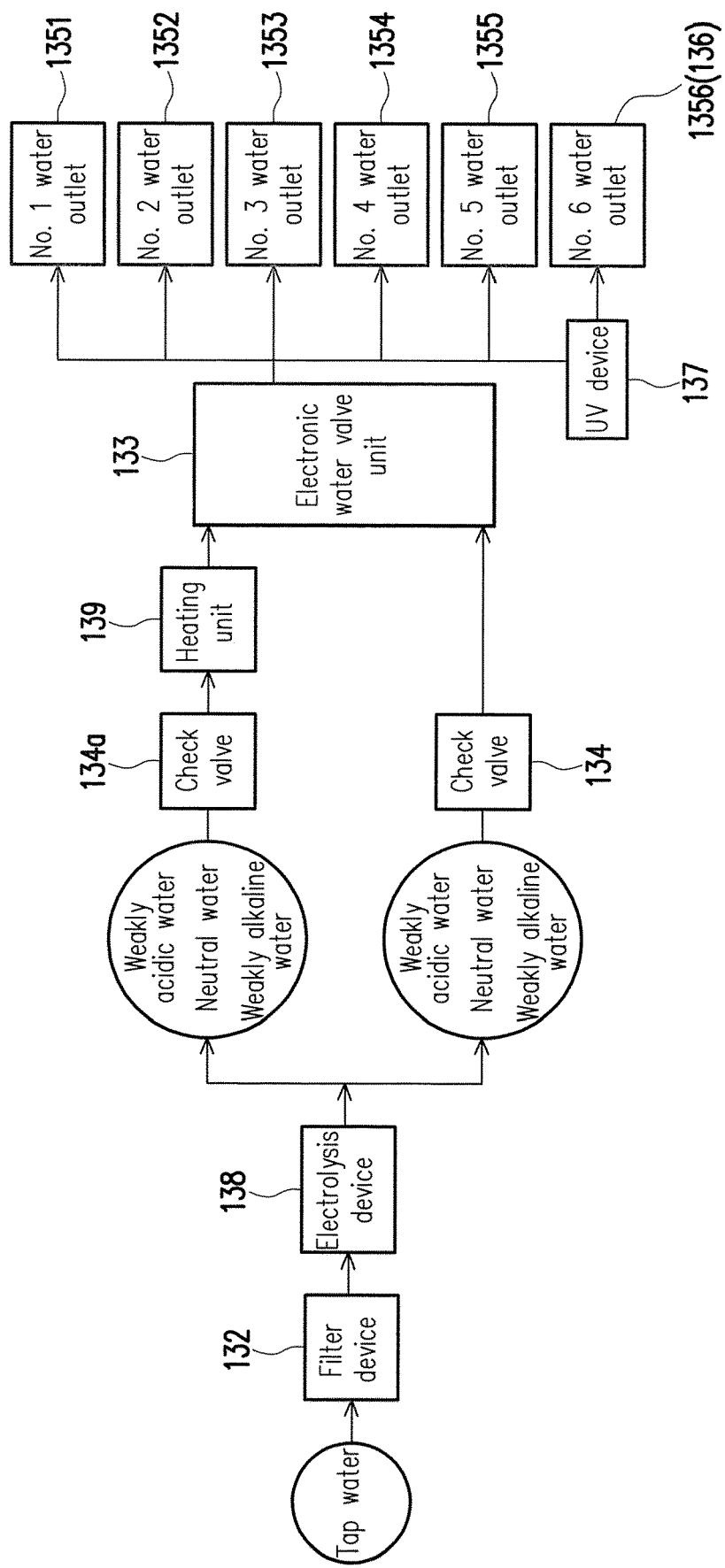
FIG. 3 is a schematic view showing tap water entering the water route system for processing.

FIG. 2 is a schematic view of the water route system 130, and FIG. 3 is a schematic view showing tap water entering the water route system 130 for processing. Referring to FIG. 2 and FIG. 3 at the same time, the water route system 130 disposed in the machine 110 is configured to provide potable water and non-potable water for the machine 110. The water route system 130 includes a water inlet pipe 131, a filter unit 132, an electronic water valve unit 133, a check valve 134, a non-potable water outlet 135, a potable water outlet 136, and a UV sterilization device 137.

The filter unit 132 is connected to the water inlet pipe 131 and is configured to filter non-potable water (e.g., tap water) entering via the water inlet pipe 131. The electronic water valve unit 133 is in communication with the filter unit 132 to receive the non-potable water filtered by the filter unit 132. The check valve 134 is disposed between the filter unit 132 and the electronic water valve unit 133 to prevent non-potable water from flowing back to the filter unit 132. The non-potable water outlet 135 is in communication with the electronic water valve unit 133, and the potable water outlet 136 is in communication with the electronic water valve unit 133 and is arranged in line with the non-potable water outlet 135 on the machine 110 to form the machine water outlet 110a. In the present embodiment, five non-potable water outlets 135 are disposed and are numbered as a No. 1 water outlet 1351 to a No. 5 water outlet 1355, and the potable water outlet 136 is numbered as a No. 6 water outlet 1356.

The UV sterilization device 137 is disposed between the electronic water valve unit 133 and the potable water outlet 136 and is configured to sterilize the non-potable water, which is to flow into the potable water outlet 136, to form the potable water.

In addition, the water route system 130 may further include an electrolysis device 138 disposed between the filter unit 132 and the check valve 134. Through the treatment of the electrolysis device 138, the properties of water can be changed, and the filtered tap water can be prepared into neutral water, alkaline ionized water, or acidic ionized water.

Moreover, the water route system 130 further includes a heating unit 139 disposed between a check valve 134a and the electronic water valve unit 133. The water flowing into the heating unit 139 is heated to form water having a suitable temperature as needed to flow out of the heating unit 139. The heated water may be supplied via the non-potable water outlet 135, or may be formed into potable water for drinking after sterilization by the UV sterilization device 137 and supplied via the potable water outlet 136.

Furthermore, the water route system 130 further includes a power supply unit 140 electrically connected to the electronic water valve unit 133 to supply power to the electronic water valve unit 133, so that the electronic water valve unit 133 can regulate the pressure or flow of the potable water or non-potable water flowing from the machine water outlet 110a as needed. In addition, the water route system 130 further includes a water outlet pipe 141 configured to discharge the water filtered out by the filter unit 132 to discharge the filtered water out of the machine 110.

Figure 4:
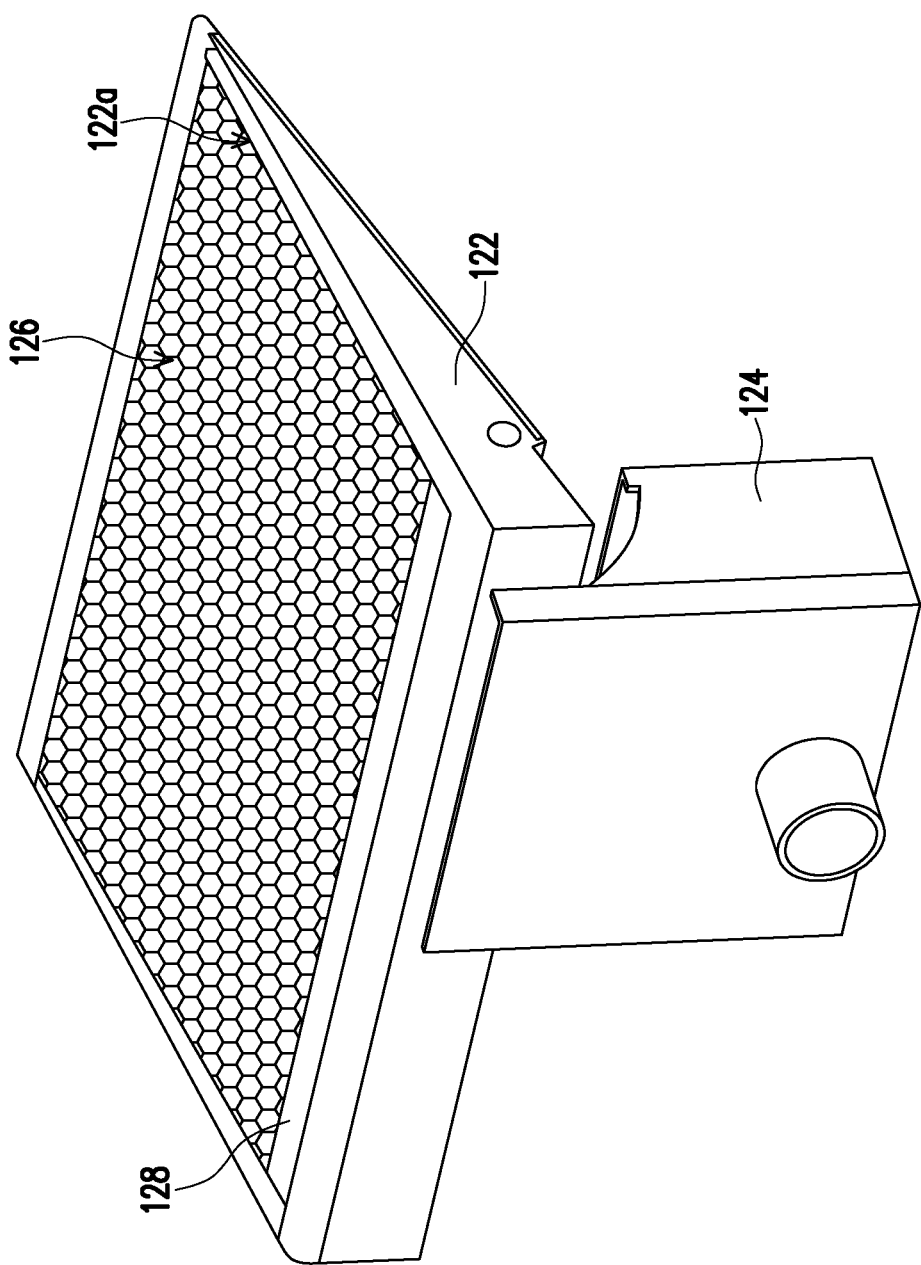
FIG. 4 is a schematic view of a movable hand washing table.
Figure 5:
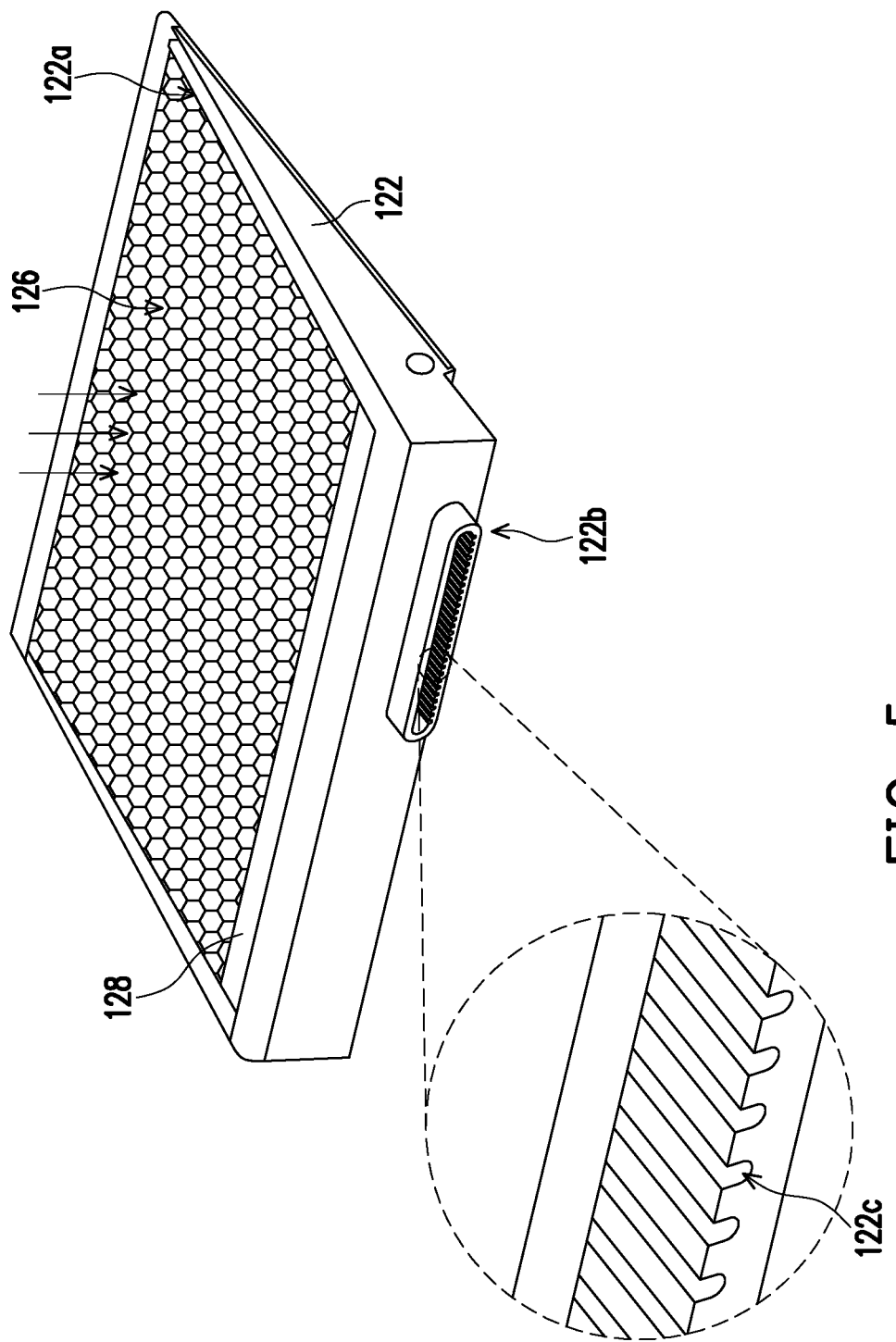
FIG. 5 is a schematic view of a water sink of FIG. 4 viewed from another perspective.
Figure 6:
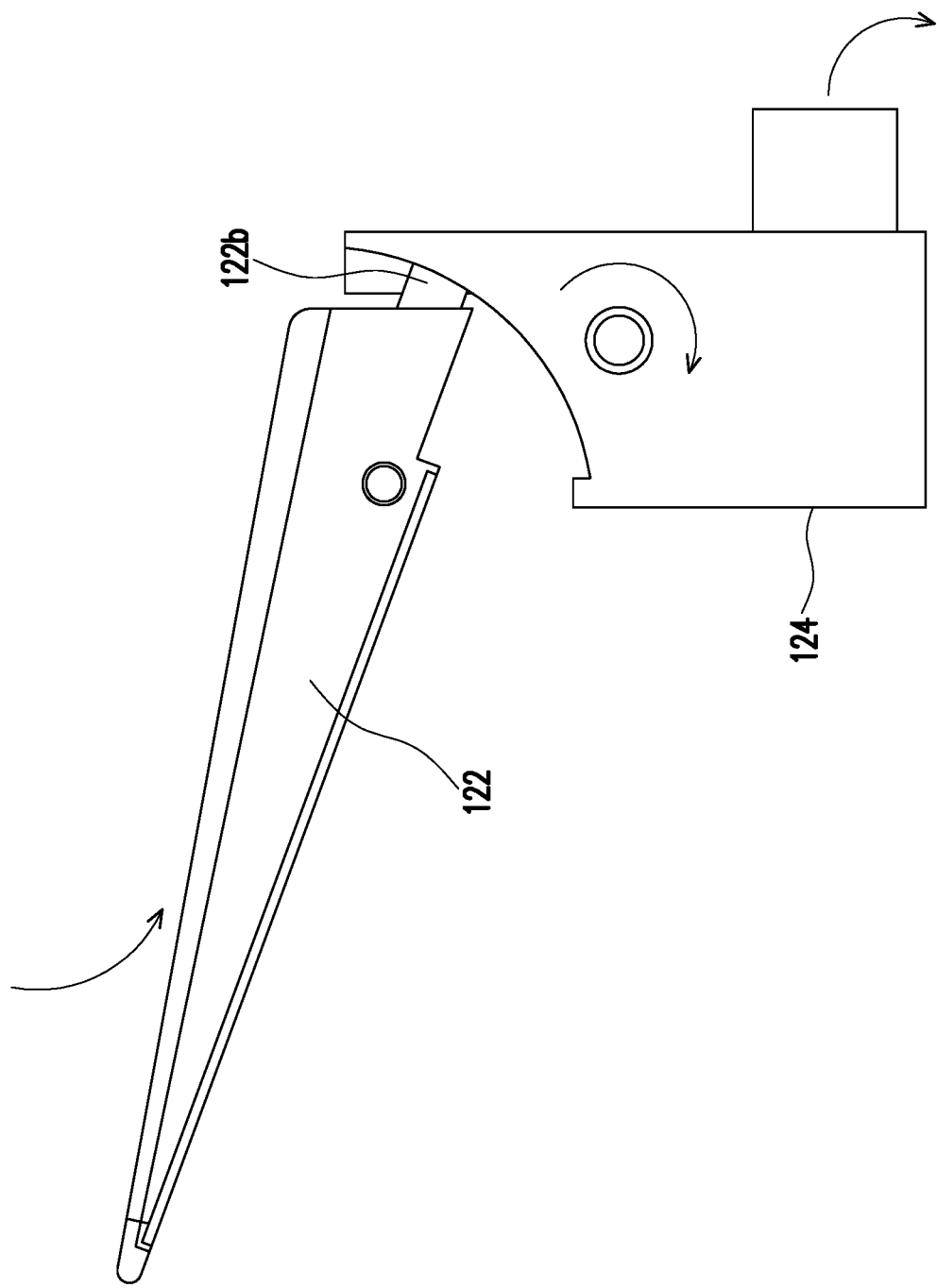
FIG. 6 is a schematic view of the water sink being pivotally opened with respect to a water collection tank.

FIG. 4 is a schematic view of the movable hand washing table, FIG. 5 is a schematic view of a water sink of FIG. 4 viewed from another perspective, and FIG. 6 is a schematic view of the water sink being pivotally opened with respect to a water collection tank. Referring to FIG. 4, FIG. 5 and FIG. 6 at the same time, the movable hand washing table 120 includes a water sink 122, a water collection tank 124, and a water collection plate 126. The water sink 122 is pivoted on the machine 110 so that the water sink 122 can be opened or retracted with respect to the machine 110. The water sink 122 has a water collection opening 122a and a sink water outlet 122b. When the movable hand washing table 120 is opened with respect to the machine 110, the water collection opening 122a is located below the machine water outlet 110a and faces the machine water outlet 110a. The water collection tank 124 is disposed in the machine 110 and is in communication with the water sink 122 via the sink water outlet 122b to receive the waste water discharged from the water sink 122. The water collection plate 126 is disposed in the water collection opening 122a, and the water collection plate 126 is capable of collecting and guiding the water thereon to flow into the water sink 122.

The water collection plate 126 may be in the form of a honeycomb, and the honeycomb-shaped water collection plate 126 may prevent the water, which flows out from the machine water outlet 110a and flows through the water collection plate 126 into the water sink 122, from splashing out of the water sink 122.

The water sink 122 further includes an overflow prevention plate 128. The overflow prevention plate 128 is located on a side of the water sink 122 adjacent to the water collection tank 124, and the water collection plate 126 is connected to the overflow prevention plate 128. The overflow prevention plate 128 is capable of preventing water in the water sink 122 from overflowing from the edge of the water collection plate 126 to outside the water sink 122.

In addition, a cross-section of the water sink 122 is substantially in a triangular shape. When the movable hand washing table 120 is opened with respect to the machine 110, the water sink 122 pivotally rotates by an angle with respect to the water collection tank 124 (as shown in FIG. 6), the side on which the water collection plate 126 is disposed is substantially parallel to the base plane (not labeled) on which the sanitary equipment 100 is placed, and the bottom side configured to form the sink bottom of the water sink 122 may be a slope surface that slopes downward toward the machine 110. The bottom side which is configured as the slope surface helps to accelerate discharge of the waste water flowing into the water sink 122 out to the water collection tank 124 to avoid water accumulation in the water sink 122.

Figure 7:
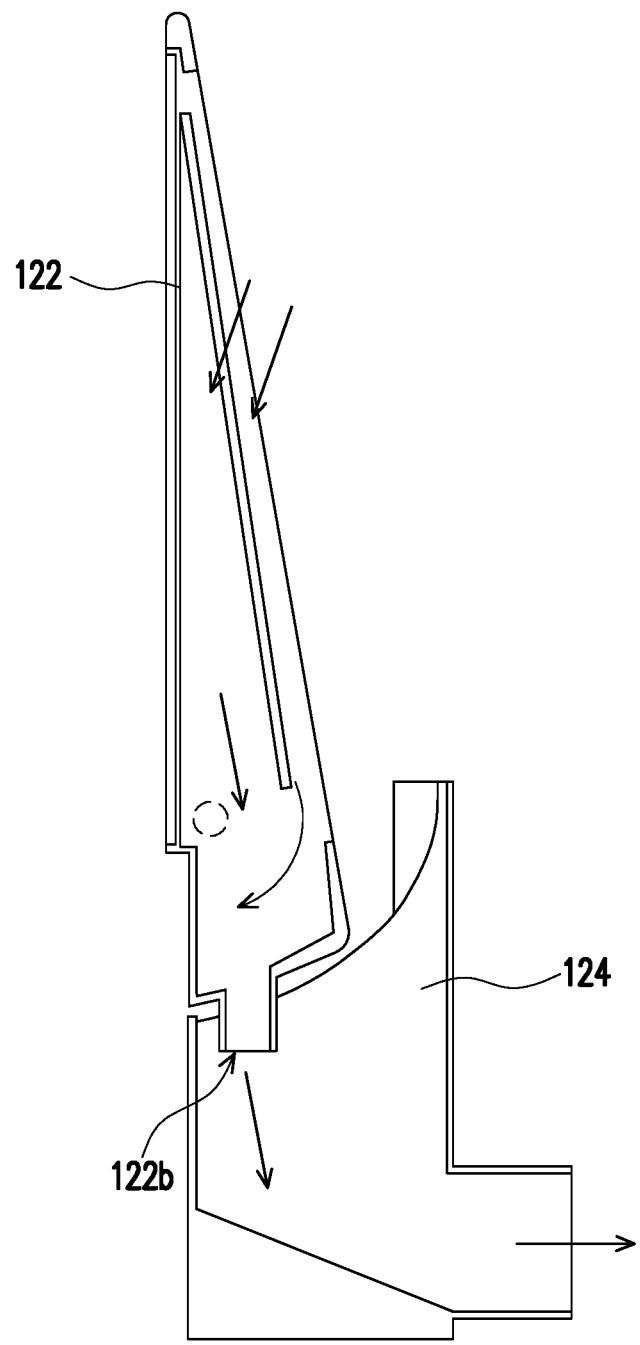
FIG. 7 is a schematic view of the water sink retracted with respect to the water collection tank.

FIG. 7 is a schematic view of the water sink retracted with respect to the water collection tank. As shown in FIG. 7, when the movable hand washing table 120 is retracted with respect to the machine 110, the water sink 122 is substantially parallel with respect to the water collection tank 124.

In addition, to allow the water accumulated in the water sink 122 to flow into the water collection tank 124 more quickly, a plurality of water guide grooves 122c configured to guide the water flow may be disposed at the sink water outlet 122b, as shown in FIG. 5.

Figure 8:
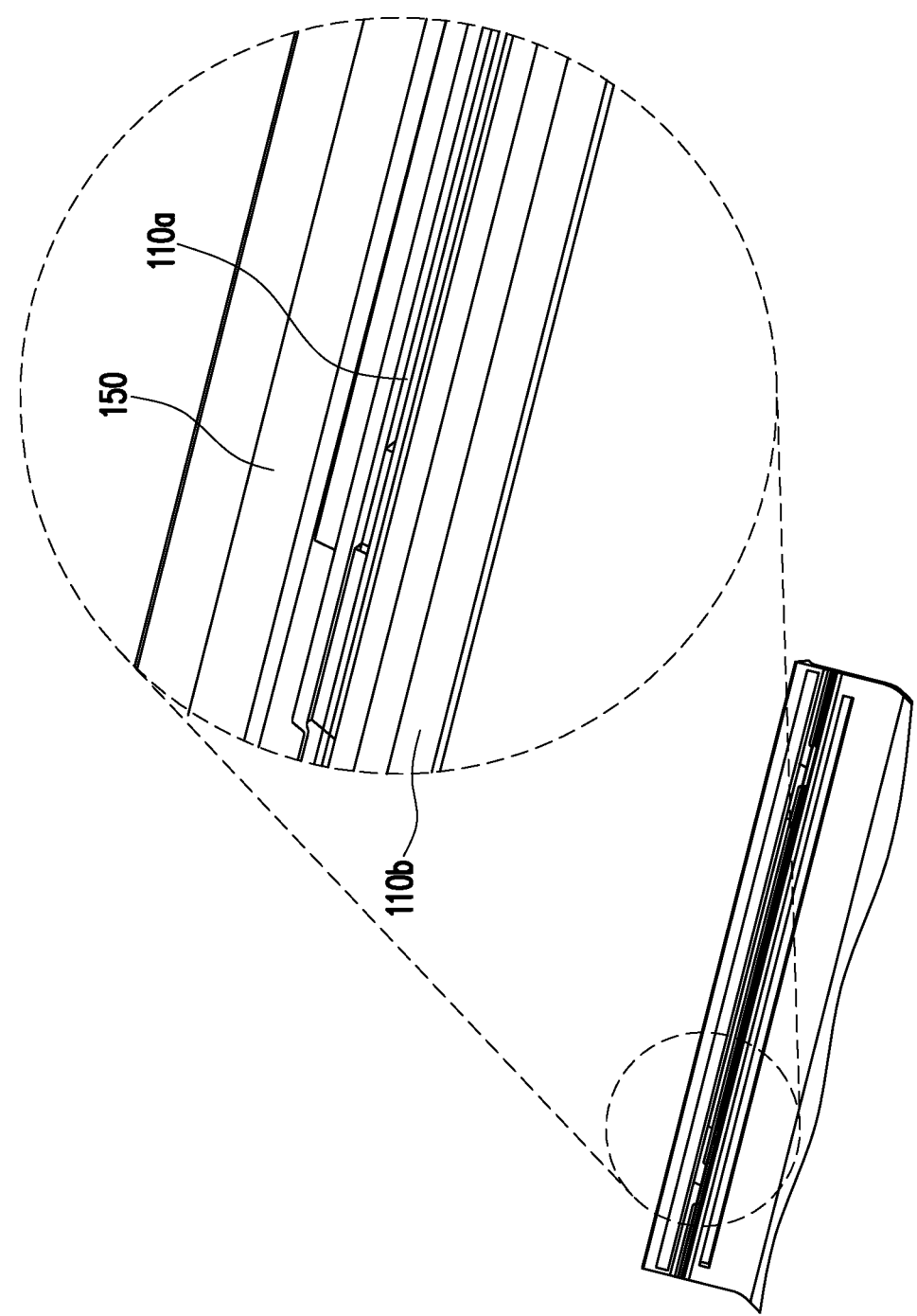
FIG. 8 is a schematic partial view of a machine.
Figure 9:
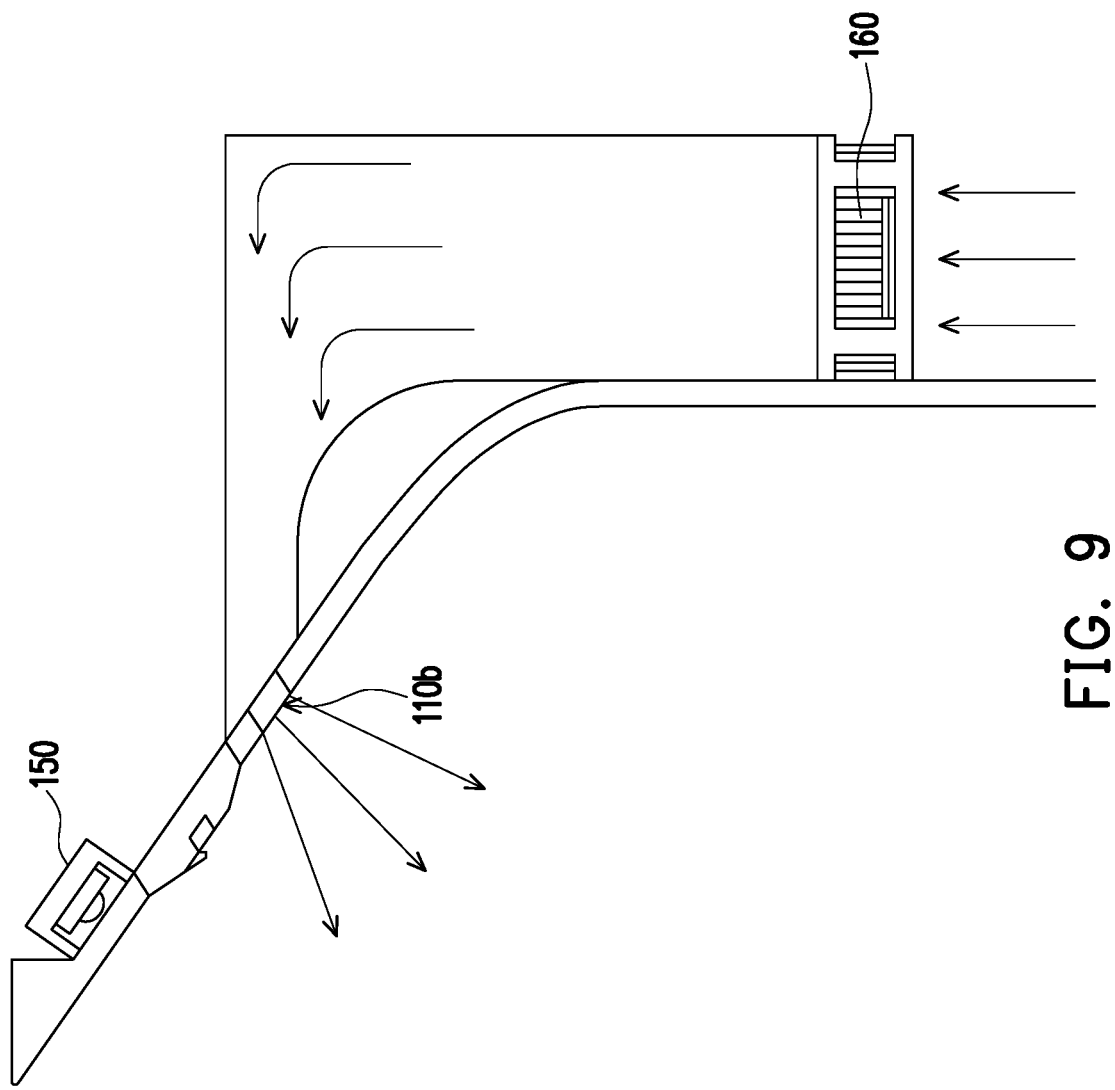
FIG. 9 is a schematic view showing the sanitary equipment provided with a UV sterilization lamp of FIG. 8.

FIG. 8 is a schematic partial view of the machine 110, and FIG. 9 is a schematic view showing the sanitary equipment 100 provided with a UV sterilization lamp 150 and a fan 160. Referring to FIG. 8 and FIG. 9 at the same time, the machine 110 further includes a UV sterilization lamp 150 disposed adjacent to the machine water outlet 110a. The UV sterilization lamp 150 may provide UV light to inhibit bacterial growth on the movable hand washing table 120.

In the present embodiment, the UV sterilization lamp 150 may be formed by one single light tube or may be configured by arranging a plurality of LEDs in a row.

Referring to FIG. 8 and FIG. 9 again, the machine 110 further includes an air outlet 110b located on one side of the machine water outlet 110a. The machine 110 may be provided with a fan 160. Through the forced convection caused by the rotation of the fan 160, air is discharged from the air outlet 110b. In the present embodiment, the air outlet 110b is configured as a sheet-shaped air outlet and is disposed in line with the UV sterilization lamp 150 and the water outlet of the machine 110. The water outlet of the machine 110 may be located between the air outlet 110b and the UV sterilization lamp 150 but is not limited thereto. Those skilled in the art may adjust the configuration methods and the configuration positions of the water outlet of the machine 110, the air outlet 110b, and the UV sterilization lamp 150 according to the requirements.

Figure 10A:
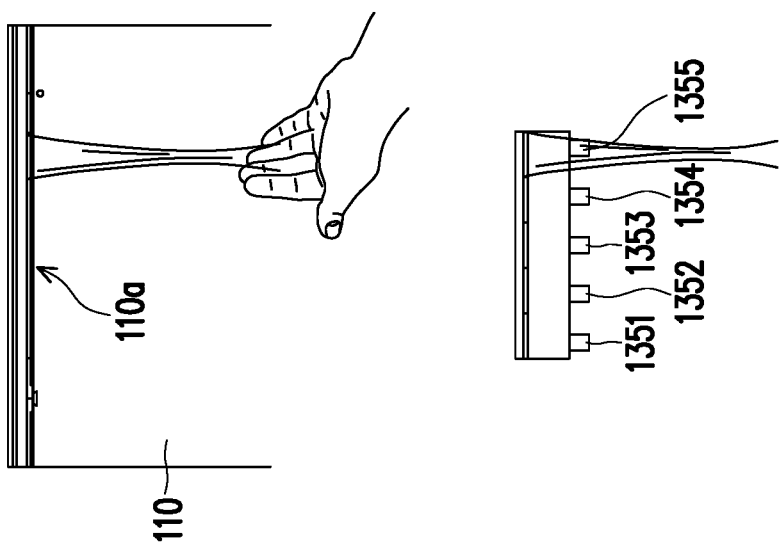
FIG. 10A to FIG. 10C are schematic views showing the machine discharging water corresponding to an object.
Figure 10B:
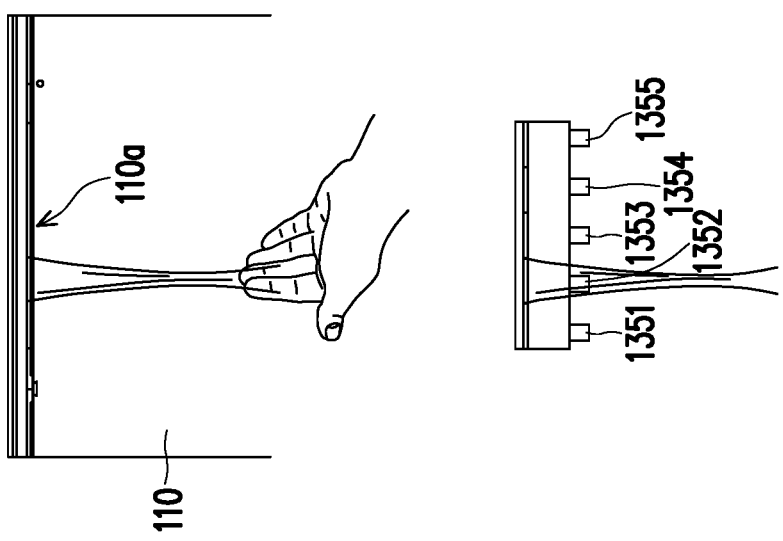
Figure 10C:
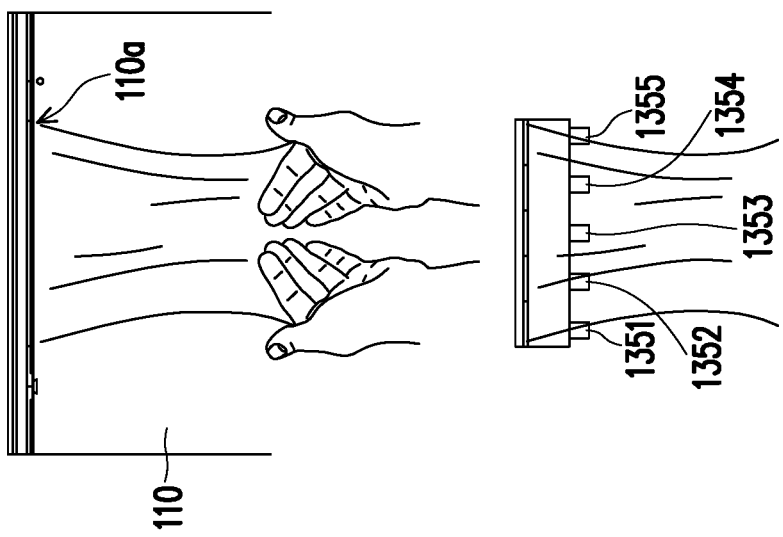

FIG. 10A to FIG. 10C are schematic views showing the machine 110 discharging water corresponding to an object. Referring to FIG. 10A to FIG. 10C at the same time, the machine water outlet 110a has a plurality of water sub-outlets. The water sub-outlets may be the non-potable water outlets 135 (the No. 1 water outlet 1351 to the No. 5 water outlet 1355) and the potable water outlet 136 (the No. 6 water outlet 1356) (not shown in FIG. 10A to FIG. 10C) described above. In the present embodiment, the non-potable water outlets 135 are disposed to be arranged in a row, and the potable water outlet 136 may also be disposed to be arranged in a row with the non-potable water outlets 135. However, the No. 6 water outlet 1356 is generally spaced apart from the No. 5 water outlet 1355 by a larger distance for recognition to avoid misuse. Alternatively, the potable water outlet 136 may also be separately disposed to allow the user to easily distinguish between the potable water outlet 136 and the non-potable water outlets 135.

The machine 110 further includes a plurality of water discharge sensing units 171 to 175. The water discharge sensing units 171 to 175 are disposed corresponding to the water sub-outlets in a one-to-one manner. Accordingly, when at least one of the water discharge sensing units 171 to 175 detects an object, which may be a user's hands or a container, the water sub-outlets corresponding to the water discharge sensing units 171 to 175 which detect the object will discharge water. As shown in FIG. 10A and FIG. 10B, when one water discharge sensing unit 175 or 172 senses an object (e.g., the user's hand), the corresponding water sub-outlet discharges the liquid. As shown in FIG. 10C, when multiple water discharge sensing units 171 to 175 simultaneously sense an object (e.g., the user's hand), the multiple corresponding water sub-outlets simultaneously discharge the liquid. FIG. 10A to FIG. 10C only show the water sub-outlets which are the non-potable water outlets 135 (i.e., the No. 1 to No. 5 water outlets) and do not show the water sub-outlet which is the potable water outlet 136 (the No. 6 water outlet 1356). However, a water discharge sensing unit is also correspondingly disposed at the potable water outlet 136.

In addition, in the case where the water discharge sensing units 171 to 175 are not disposed, it is also possible to control which one or which ones of the water outlets discharge water by a control panel disposed on the machine 110.

Figure 11A:
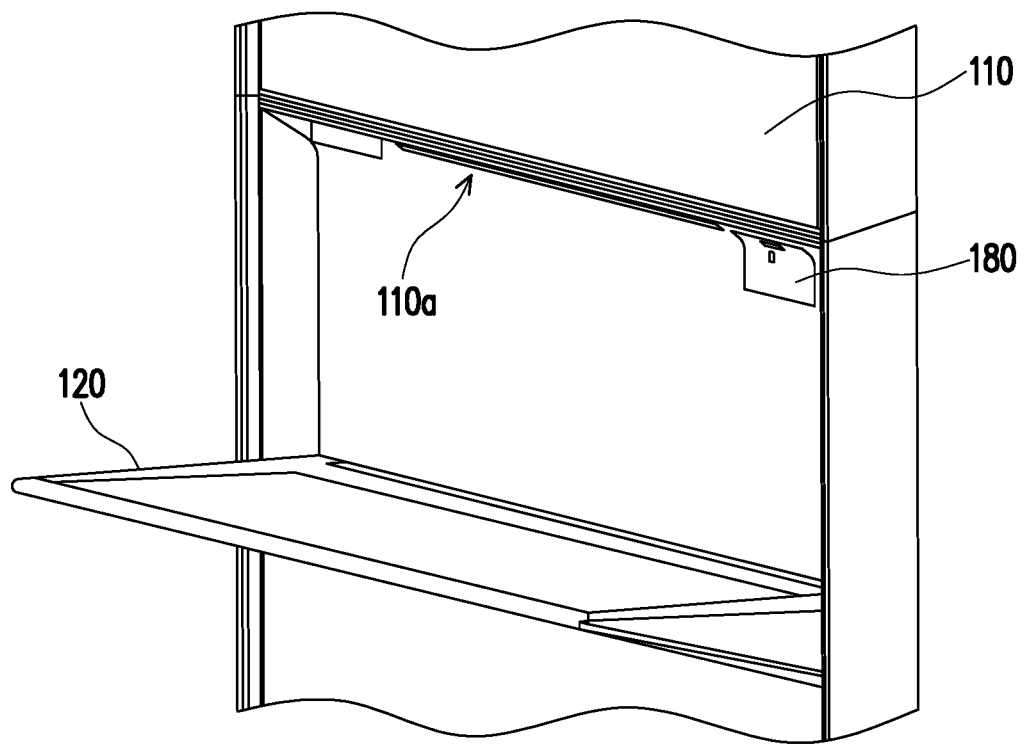
FIG. 11A is a schematic partial view of FIG. 1.
Figure 11B:
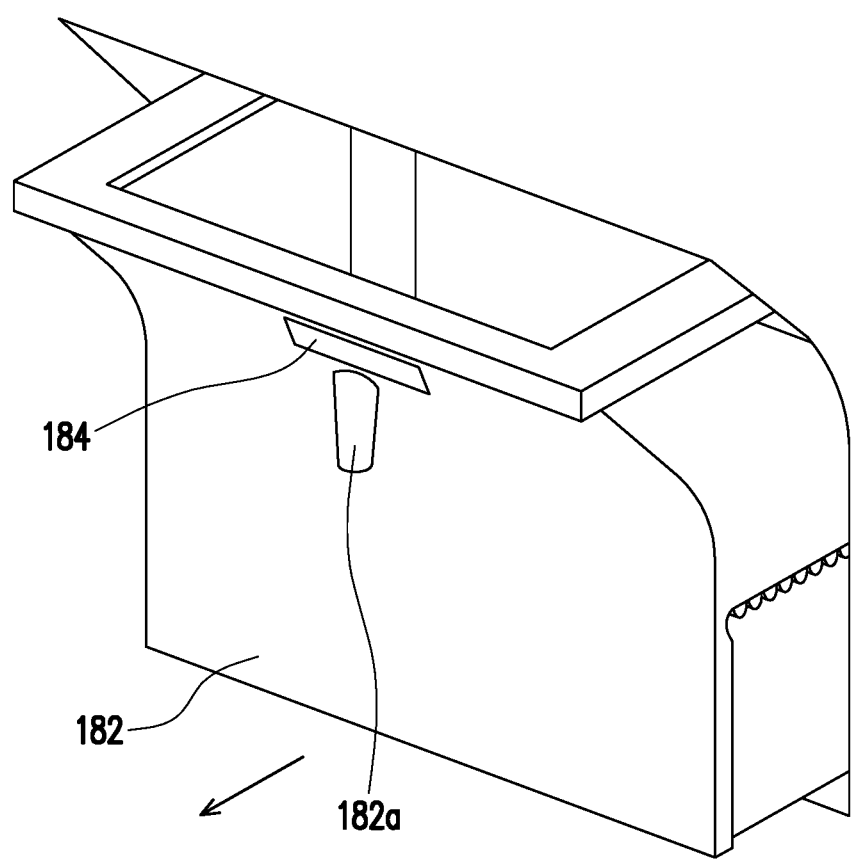
FIG. 11B is a schematic view showing a hand soap supply unit in FIG. 11A withdrawn with respect to the machine.
Figure 11C:
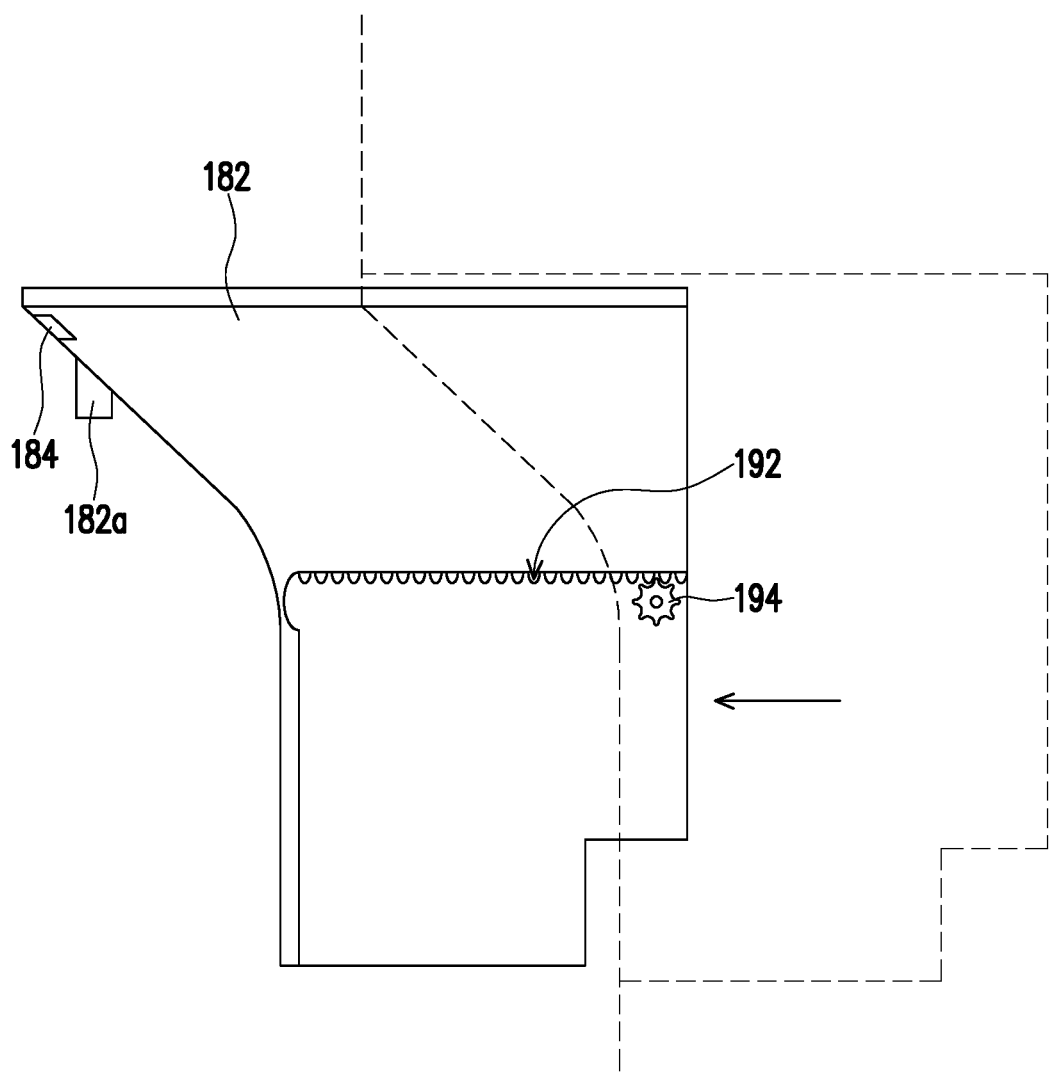
FIG. 11C is a side view of FIG. 11B.

FIG. 11A is a schematic partial view of FIG. 1, FIG. 11B is a schematic view showing a hand soap supply unit in FIG. 11A withdrawn with respect to the machine 110, and FIG. 11C is a side view of FIG. 11B. Referring to FIG. 11A, FIG. 11B, and FIG. 11C at the same time, the machine 110 further includes a hand soap supply unit 180 which is disposed in the machine 110 and located on one side of the machine water outlet 110a. The hand soap supply unit 180 includes a hand soap tank 182 and an infrared sensor 184. The hand soap tank 182 is movably assembled to the machine 110 to be relatively received in the machine 110 or withdrawn out of the machine 110. The hand soap tank 182 is located on one side of the machine water outlet 110a. Of course, the configuration position of the hand soap tank 182 is not limited thereto, and the designer may change the configuration position of the hand soap tank 182 according to the actual requirements.

The hand soap tank 182 has a hand soap outlet 182a. The infrared sensor 184 is disposed on an outer side of the hand soap tank 182 toward the movable hand washing table 120, and the hand soap outlet 182a is located below the infrared sensor 184.

When hand soap is to be filled into the hand soap tank 182, the hand soap tank 182 may be manually pulled out of the machine 110. Alternatively, a corresponding mechanism may also be disposed so that the hand soap tank 182 can be automatically withdrawn with respect to the machine 110. As shown in FIG. 11C, through the cooperation of a rack 192 and a gear 194 of the hand soap tank 182 and the machine 110, the hand soap tank 182 can be automatically removed with respect to the machine 110. In the present embodiment, the rack 192 is disposed on the side of the hand soap tank 182, and the gear 194 is disposed on the machine 110. The rack 192 and the gear 194 engage with each other, and a motor (not shown) disposed in the machine 110 drives the gear 194 to rotate so that the hand soap tank 182 can be moved out of the machine 110 or moved back into the machine 110. Of course, the mechanism for removing the hand soap tank 182 with respect to the machine 110 is not limited to the cooperation of the gear 194 and the rack 192 and may also be achieved through a linkage mechanism. Moreover, the moving out or moving back of the hand soap tank 182 with respect to the machine 110 may be controlled by the control panel disposed on the machine 110.

Figure 12:
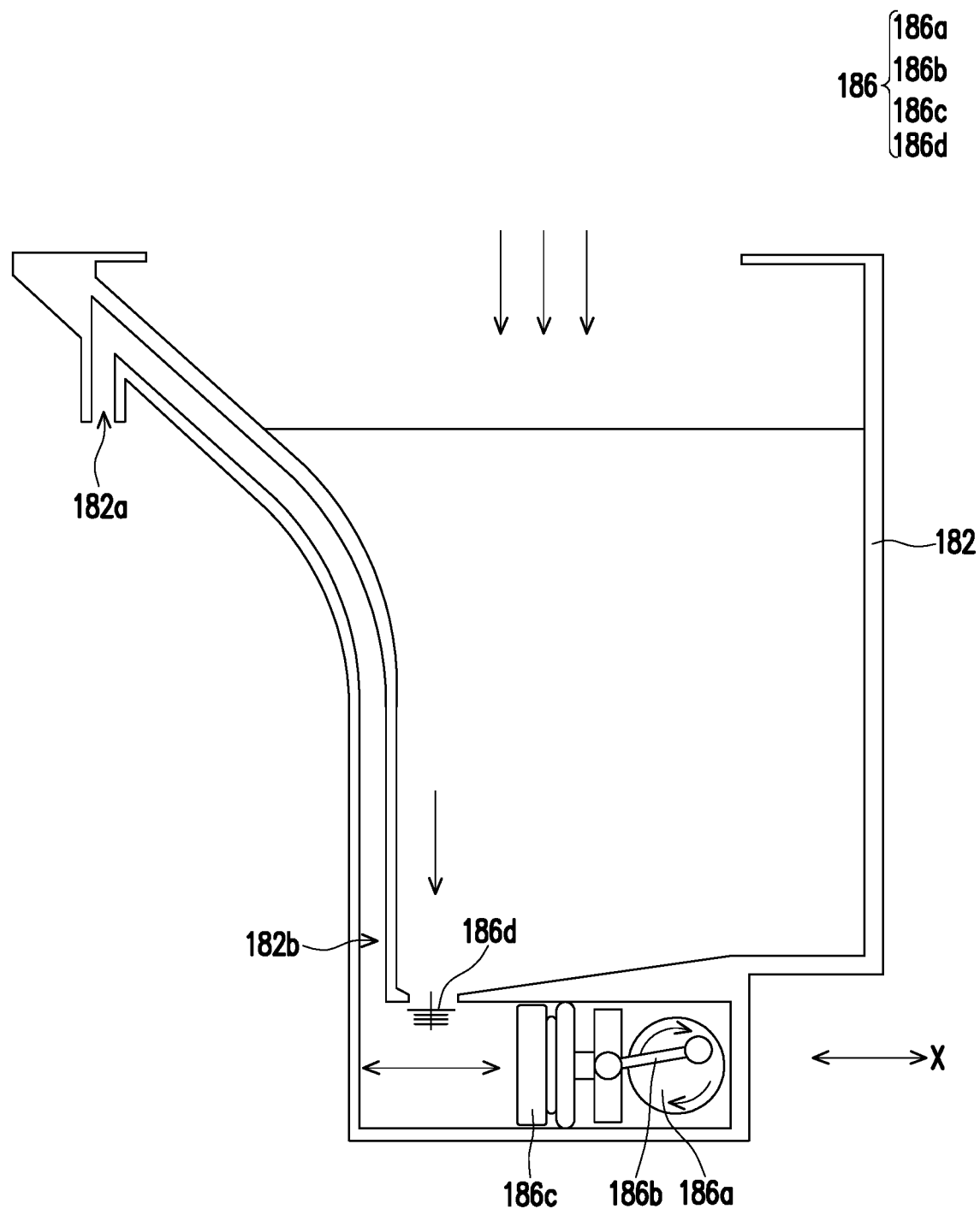
FIG. 12 is a cross-sectional view of a hand soap tank.

FIG. 12 is a cross-sectional view of the hand soap tank 182. Referring to FIG. 11B and FIG. 12, the hand soap tank 182 further has a hand soap flow path 182b in communication with the hand soap outlet 182a, and a power device 186 configured to squeeze out the hand soap contained in the hand soap tank 182. The power device 186 includes a rotating disc 186a, a transmission rod 186b, a piston 186c, and a hand soap check valve 186d.

The power device 186 is disposed at the lower side of the hand soap tank 182. The transmission rod 186b is linked with the rotating disc 186a, and the piston 186c is disposed at the front end of the transmission rod 186b and is driven by the transmission rod 186b. The hand soap check valve 186d is disposed at the bottom side of the hand soap tank 182. The hand soap contained in the hand soap tank 182 flows downward through the hand soap check valve 186d to the front of the piston 186c and does not flow back to above the hand soap check valve 186d due to the push of the piston 186c.

Referring to FIG. 1, when the sanitary equipment 100 is used, the movable hand washing table 120 is first opened with respect to the machine 110. At this time, the movable hand washing table 120 is located below the machine water outlet 110a.

Then, if the user wants to take potable water, a container such as a cup may be placed below the potable water outlet 136 and above the movable hand washing table 120. After the water discharge sensing unit senses the container, the electronic water valve unit 133 (shown in FIG. 3) is controlled to discharge potable water from the No. 6 water outlet 1356 (i.e., the potable water outlet 136).

Alternatively, if the user wants to take non-potable water, a container such as a cup or a washbasin may be placed below the non-potable water outlet 135 and above the movable hand washing table 120. After the water discharge sensing unit senses the container, the electronic water valve unit 133 (shown in FIG. 3) is controlled to discharge non-potable water from at least one of the No. 1 to No. 5 water outlets 1351 to 1355 (i.e., the non-potable water outlets 135).

If the user wants to wash his hands, the hands may be placed below the machine water outlet 110a and above the movable hand washing table 120. Then, as shown in FIG. 10A, FIG. 10B, and FIG. 10C, the water sub-outlets (i.e., the non-potable water outlets 135) corresponding to the water discharge sensing units which sense the user's hands discharge water for washing the hands or preliminarily wetting the hands located below the machine water outlet 110a.

Based on the above, it is understood that through the configuration of the water discharge sensing units 171 to 175, the water supply area can be dynamically adjusted according to the movement state of the user's hands, which is convenient for the user to use.

Figure 13:
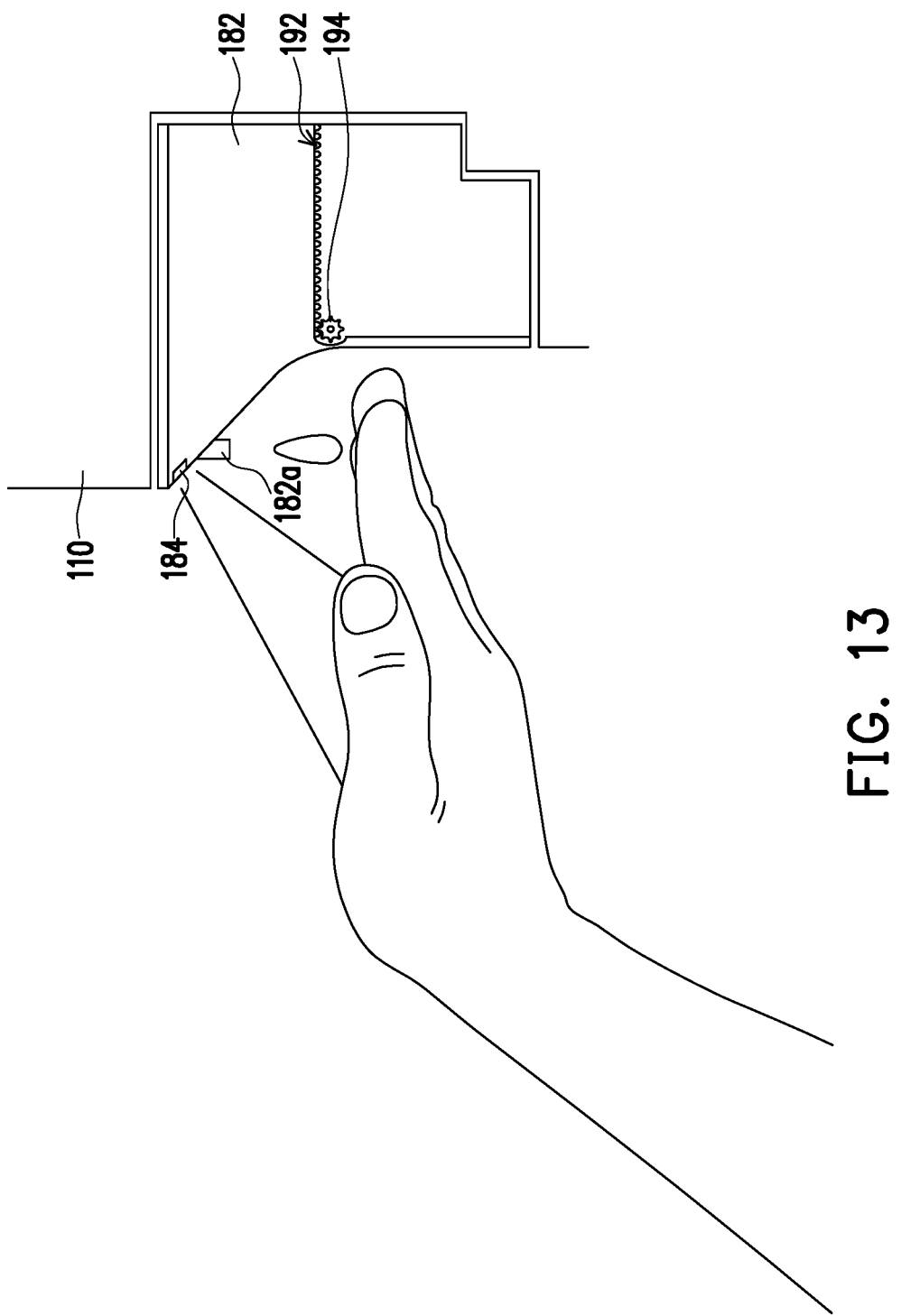
FIG. 13 is a schematic view showing the hand soap supply unit supplying a hand soap.

In addition, referring to FIG. 11A, FIG. 12, and FIG. 13 at the same time, since the hand soap supply unit 180 is disposed beside the machine water outlet 110a, the user's hands may be moved to a position (as shown in FIG. 13) that can be sensed by the infrared sensor 184 of the hand soap supply unit 180 at this time. When the infrared sensor 184 senses the hands, the rotating disc 186a of the power device 186 is driven to rotate. Due to the rotation of the rotating disc 186a, the transmission rod 186b connected to the rotating disc 186a can linearly move back and forth in a first direction X and thereby drive the piston 186c to move to squeeze the hand soap, which comes from the hand soap tank 182 through the hand soap check valve 186d into the front side of the piston 186c, into the hand soap flow path 182b, and the hand soap adjacent to the hand soap outlet 182a is squeezed out of the hand soap outlet 182a and falls on the user's hands. The user may cleanse his hands with this hand soap, and then move the hands cleansed with the hand soap back to below the machine water outlet 110a to wash the hand soap away from the hands with water.

Although the present embodiment has been illustrated with hand soap, those of ordinary skill may change the hand soap to other cleansing products, such as disinfecting alcohol, etc. according to the requirements.

Specifically, since the water collection plate 126 disposed in the water collection opening 122a is in a honeycomb shape, the splash prevention effect can be achieved. Therefore, in the above process of washing hands by the user, after water enters the water sink 122 through the water collection plate 126, water does not splash out due to the impact caused by an overly large water amount or an overly shallow water sink 122.

Next, by operating the control panel disposed on the machine 110, the fan 160 may be rotated to generate wind, and the wind flows out of the air outlet 110b to dry the user's hands.

After the movable hand washing table 120 is used, the user may retract the movable hand washing table 120 with respect to the machine 110. The water in the water sink 122 is introduced into the water collection tank 124 via the sink water outlet 122b, and the water guide grooves 122c can guide the direction of water flow and accelerate drainage.

After the movable hand washing table 120 is retracted with respect to the machine 110, by operating the control panel, the UV sterilization lamp 150 may be turned on, and the UV sterilization lamp 150 provides UV light to inhibit bacterial growth on the movable hand washing table 120.

In summary of the above, the invention provides a sanitary equipment with a water supply system, a water route system 130, and a hand washing table. The sanitary equipment is provided with the movable hand washing table 120 which can be opened or retracted with respect to the machine 110, so that when the movable hand washing table 120 is retracted with respect to the machine 110, the machine 110 can be installed in a more space-saving manner.

Furthermore, the honeycomb plate is used as the water collection plate 126 of the hand washing table, so that the effect of water overflow and splash prevention can be achieved.

In addition, the shape of the water sink 122 and the configuration of the water guide grooves 122c both help to accelerate discharge of the water in the water sink 122, which can prevent waste water from accumulating in the water sink 122 and causing mosquito or bacterial growth.

Moreover, the configuration of the UV sterilization lamp 150 can inhibit bacterial growth on the movable hand washing table.

The water discharge sensing units are disposed corresponding to the water sub-outlets of the machine water outlet 110a in a one-to-one manner. Therefore, through the sensing of the water discharge sensing units, water can be dynamically and efficiently supplied according to the object (the user's hands or a container) to reduce waste.

The design of the fan 160 and the air outlet 110b provides the sanitary equipment with a drying function.

The water route system 130 disposed in the machine 110 is not only provided with a novel architecture to thus ensure proper water supply, but is also provided with the filter unit 132, the electrolysis device 138, and the UV sterilization device 137 to thus adjust the water quality and convert non-potable water into potable water that can be safely drunk.

Therefore, the above sanitary equipment exhibits versatility and convenience of use in a private place such as a home, or in a public place such as a department store counter, a food street, or other possible installation locations.

What is claimed is:

1. A sanitary equipment with a water supply system, comprising:
    a machine having a machine water outlet;
    a movable hand washing table pivoted on the machine and located below the machine water outlet, wherein the movable hand washing table is capable of opening or retracting with respect to the machine; and
    a water route system disposed in the machine and connected to the machine water outlet to discharge potable water and non-potable water from the machine water outlet,
    wherein the water route system comprises:
        a water inlet pipe;
        a filter unit connected to the water inlet pipe and configured to filter non-potable water entering via the water inlet pipe,
        an electronic water valve unit being in communication with the filter unit to receive the non-potable water filtered by the filter unit;
        two check valves disposed between the filter unit and the electronic water valve unit, wherein one of the two check valves is configured to prevent the non-potable water from flowing back to the filter unit; and
        a heating unit disposed between the other one of the two check valves and the electronic water valve unit, wherein the other one of the two check valves is configured to prevent the potable water from flowing back to the filter unit.

2. The sanitary equipment with a water supply system according to claim 1, wherein the movable hand washing table comprises:

a water sink pivoted on the machine and being capable of opening or retracting with respect to the machine, wherein the water sink has a water collection opening and a sink water outlet;

a water collection tank disposed in the machine and being in communication with the water sink via the sink water outlet to receive a liquid discharged from the water sink; and a water collection plate disposed in the water collection opening, wherein the water collection plate is capable of collecting and guiding a liquid located thereon to flow into the water sink.

3. The sanitary equipment with a water supply system according to claim 2, wherein the water sink has an overflow prevention plate, the overflow prevention plate is located on one side of the water sink adjacent to the water collection tank, and the water collection plate is connected to the overflow prevention plate.

4. The sanitary equipment with a water supply system according to claim 2, wherein the water collection plate is in a honeycomb shape.

5. The sanitary equipment with a water supply system according to claim 2, wherein the sink water outlet has a plurality of water guide grooves.

6. The sanitary equipment with a water supply system according to claim 1, wherein the water route system further comprises:

at least one non-potable water outlet in communication with the electronic water valve unit;

a potable water outlet being in communication with the electronic water valve unit and arranged in line with the at least one non-potable water outlet on the machine to form the machine water outlet; and a UV sterilization device disposed between the electronic water valve unit and the potable water outlet and configured to sterilize the non-potable water, which is to flow into the potable water outlet, to form the potable water.

7. The sanitary equipment with a water supply system according to claim 6, wherein the water route system further comprises an electrolysis device disposed between the filter unit and one of the two check valves.

8. The sanitary equipment with a water supply system according to claim 6, wherein the water route system further comprises a power supply unit electrically connected to the electronic water valve unit.

9. The sanitary equipment with a water supply system according to claim 6, wherein the water route system further comprises a water outlet pipe configured to discharge water filtered out by the filter unit.

10. The sanitary equipment with a water supply system according to claim 1, wherein the machine further comprises a UV sterilization lamp disposed adjacent to the machine water outlet.

11. The sanitary equipment with a water supply system according to claim 1, wherein the machine further comprises an air outlet located on one side of the machine water outlet.

12. The sanitary equipment with a water supply system according to claim 1, wherein the machine water outlet has a plurality of water sub-outlets, and the machine further comprises a plurality of water discharge sensing units, wherein the water discharge sensing units are disposed corresponding to the water sub-outlets in a one-to-one manner, and when at least one of the water discharge sensing units detects an object, the water sub-outlet corresponding to the water discharge sensing unit which detects the object discharges water.

13. The sanitary equipment with a water supply system according to claim 1, wherein the machine further comprises a hand soap supply unit disposed on the machine and located on one side of the machine water outlet.

14. The sanitary equipment with a water supply system according to claim 13, wherein the hand soap supply unit comprises:

a hand soap tank movably assembled to the machine, located on one side of the machine water outlet, and being capable of being relatively received in the machine or withdrawn out of the machine, wherein the hand soap tank has a hand soap flow path and a hand soap outlet in communication with the hand soap flow path; and an infrared sensor disposed on an outer side of the hand soap tank toward the movable hand washing table.

15. The sanitary equipment with a water supply system according to claim 14, wherein the hand soap supply unit further comprises a power device configured to squeeze a hand soap contained in the hand soap tank, the power device comprising:

a rotating disc disposed on one side of the hand soap tank;

a transmission rod linked with the rotating disc;

a piston disposed at a front end of the transmission rod; and a hand soap check valve disposed at a bottom side of the hand soap tank, wherein the hand soap contained in the hand soap tank enters the hand soap flow path through the hand soap check valve.

\* \* \* \* \*